(12) United States Patent
Merensky

(10) Patent No.: US 6,474,732 B1
(45) Date of Patent: Nov. 5, 2002

(54) CHILD'S SEAT FOR AIRPLANES

(75) Inventor: Harald Merensky, Hamburg (DE)

(73) Assignee: Lufthansa Technik AG, Hamburg (DE)

( * ) Notice: Subject to any disclaimer, the term of this patent is extended or adjusted under 35 U.S.C. 154(b) by 0 days.

(21) Appl. No.: 09/633,247

(22) Filed: Aug. 4, 2000

(30) Foreign Application Priority Data

Aug. 6, 1999 (DE) ........................................ 199 37 231

(51) Int. Cl.[7] ................................................. B60N 2/32
(52) U.S. Cl. ...................... 297/14; 297/245; 297/250.1; 297/254; 297/256.1
(58) Field of Search .......................... 297/14, 250, 254, 297/245

(56) References Cited

U.S. PATENT DOCUMENTS

| | | | | |
|---|---|---|---|---|
| 3,762,764 A | * | 10/1973 | McJunkin | ..................... 297/14 |
| 4,527,828 A | * | 7/1985 | Groce | ......................... 297/14 |
| 4,541,654 A | * | 9/1985 | Jonassen | .................. 297/483.1 |
| 4,615,560 A | * | 10/1986 | Schaller | ....................... 297/254 |
| 4,993,666 A | * | 2/1991 | Baymak | ....................... 297/14 |
| 5,118,163 A | | 6/1992 | Brittian et al. | |
| 5,344,212 A | | 9/1994 | Miller et al. | |
| 5,346,279 A | * | 9/1994 | Pecorella | ................. 297/256.1 |
| 5,590,927 A | * | 1/1997 | Rapphahn | ..................... 297/14 |

* cited by examiner

*Primary Examiner*—Beth A. Stephan
(74) *Attorney, Agent, or Firm*—Diller, Ramik & Wight

(57) ABSTRACT

The child's seat for airplanes comprises a mounting adapted to be fastened to a partition wall of an airplane, and a seat fastened to the mounting such that the seat can assume two different vertical positions. In an upper takeoff and landing position, the seat is located above the head strike arc of a person seated on an airplane seat, while in a lower communicating position, assumed during the flight, the seat is at chest level of the accompanying person. Thanks to the child's seat, the number of adult passengers normally occupying passenger seats of an airplane need not be reduced.

23 Claims, 2 Drawing Sheets

CHILD'S SEAT FOR AIRPLANES

FIELD OF THE INVENTION

The invention relates to a child's seat for airplanes, in particular a child's seat for children up to two years of age.

BACKGROUND

Presently, in airplanes, children of up to two years are held on the lap of a responsible person during takeoff and landing. As an alternative, seats for children are provided that are fastened on an airplane seat. The child is well restrained in these seats, but at the expense of a seat for a paying grown-up passenger. Further, for the duration of the flight, i.e. outside takeoff and landing, baby basinets are known that are fastened to the back of cabin partitions. Seats for children may also be mounted in this manner.

U.S. Pat. No. 5,344,212 describes a child's seat for airplanes comprising a mounting to be fastened to a partition wall of an airplane. The mounting supports a seat arranged at a fixed height. A small space is provided between the child's seat and an opposite seat for a grown-up. It is not ensured that the head strike arc of the seat for the grown-up is clear.

U.S. Pat. No. 5,118,163 describes a child's seat mounted in front of the seat for a grown-up to a transverse bar below that seat. Here, the child sits between the legs of a person sitting in the adult's seat. In a special embodiment, the child's seat is mounted to a partition wall of the plane immediately on the cabin floor.

A general problem is that any child's seat that is also used during takeoff and landing, usually causes the loss of a regular seat.

SUMMARY OF THE INVENTION

It is an object of the present invention to provide a child's seat for airplanes that may be used during takeoff and landing, with the head strike arc remaining clear, and which allows the child to be comfortably turned to a grown-up during the flight.

The child's seat of the invention comprises a mounting to be fastened at a partition wall of an airplane, the seat being adapted to be fixed at at least two vertical positions on the mounting. During the flight, the seat may be lowered so that it is located, e.g., on the level of the chest of an accompanying person seated on an airplane seat. During takeoff and landing, the seat is adjusted in the top position so as to not obstruct the space in front of the seated accompanying person. Regulations provide that during takeoff and landing a head strike arc must remain clear of any objects for each person sitting on an airplane seat. The head strike arc defines the space the head and chest of a sitting person move through in case of a strong deceleration of the plane. During takeoff and landing, the seat of the invention may be moved to an upper position above the head strike arc of the associated airplane seat. In case of an accident, a collision between the passenger and the small child is avoided.

The present child's seat is advantageous in that an enlargement of the distance between the partition wall and the first row of seats is not necessary. Thus, the child's seat does not use up passenger space. During the flight, the seat is pulled down to a position that is comfortable to the accompanying person. Suitably, this lower position is variable or adjustable. Preferably, the top position that is the position during takeoff and landing, is fixedly predetermined. In a preferred embodiment of the invention, the seat is a bucket seat with a back portion and a molded seat pivotally adjustable with respect to the back portion. The molded seat allows to select between a sitting and a sleeping position of the child.

The back portion of the seat is suitably suspended on the mounting by its upper end and comprises a movable support device for moving the back portion into an inclined position relative to the partition. Thus, it is possible to move the entire seat into an inclined sleeping position.

To store the child's seat in a compact manner when not in use, the molded seat may suitably be pivoted against back portion.

The seat may be adapted to be pivoted and fixed about a longitudinal axis extending in the longitudinal direction of the plane. This increases the variability of the child's seat.

The vertical displacement of the seat may be effected or assisted by a drive means moving the seat along the mounting. Such a drive means may be, for example, an electric motor or a gas spring.

BRIEF DESCRIPTION OF THE DRAWINGS

The following is a detailed description of an embodiment of the present invention with reference to the accompanying drawings.

In the Figures.

DETAILED DESCRIPTION OF A PREFERRED EMBODIMENT

Figure 1:
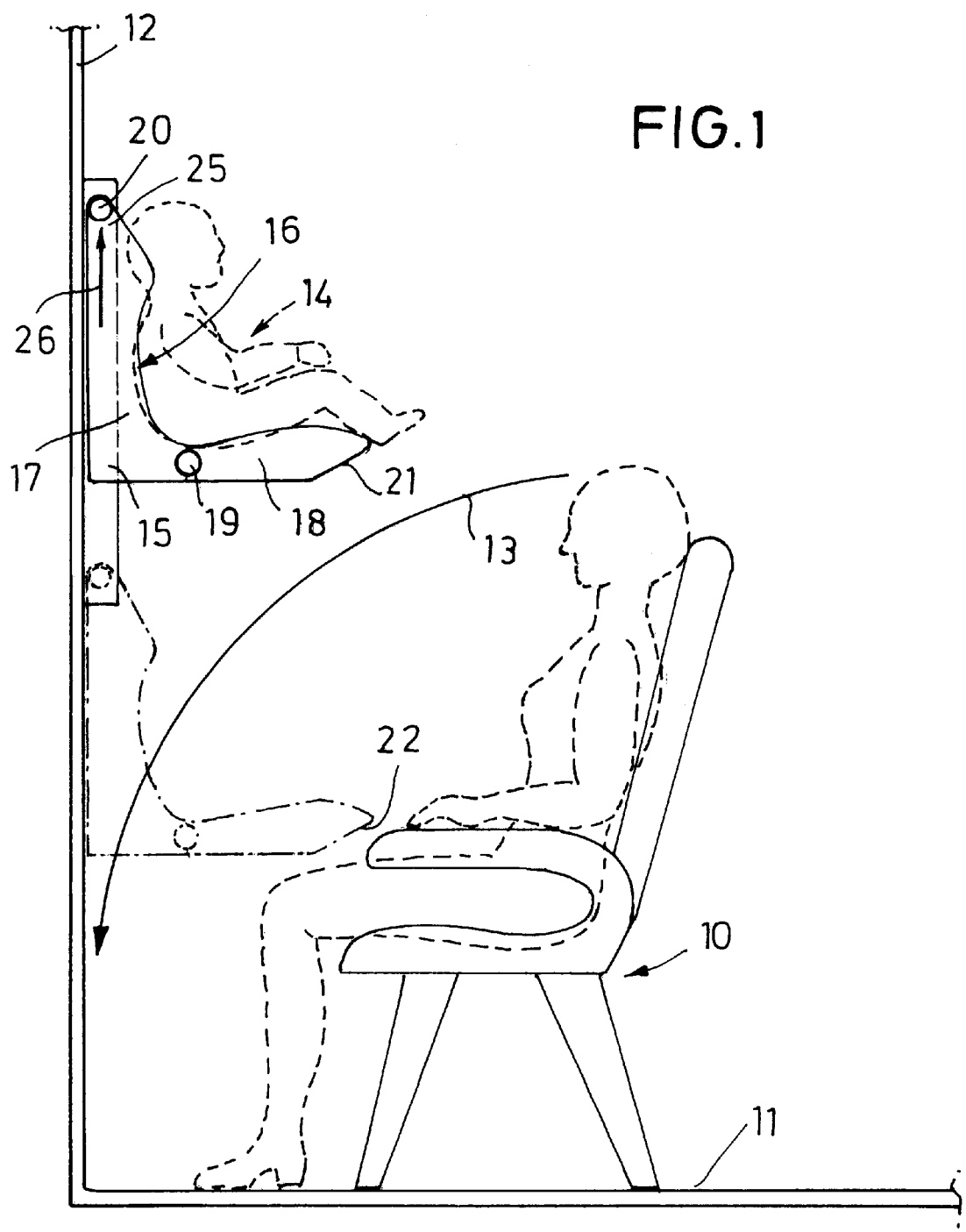
FIG. 1 illustrates a schematic side elevational view of the child's seat, two useful positions of the seat being shown.

Referring now to the drawings, the figures illustrate a conventional airplane seat 10 located in the passenger compartment of the plane and fastened to the floor 11. In front of the airplane seat 10, a partition wall 12 extends transverse to the longitudinal direction of the plane. The airplane seat 10 is spaced from the partition wall 12 such that no obstructions are present along a head strike arc 13 defined by the head strike radius which a belted seated person would cover when the person should be bent over forward. This arc 13 also defines the minimum distance of the airplane seat 10 from the partition wall 12.

The child's seat 14 comprises a mounting 15 fastened to the partition wall 12 and a seat 16 vertically displaceable along the mounting 15. The seat 16 is a bucket seat comprising a back portion 17 and a molded seat surface 18 connected with the back portion 17 through a hinge 19. The seat further comprises a safety belt (not illustrated) with which to restrain the child.

The back portion 17 has horizontal pins 20 at its top end 25 guided for vertical displacement within guide means 26 of the mounting 15.

The guide means 26 is designed and mounted such that the seat 16 can take two different vertical positions, i.e., an upper takeoff and landing position 21 and a lower communicating position 22. In the takeoff and landing position, the seat 16 is located approximately at head level of the person sitting in the airplane seat 10 and above the head strike arc 13, whereas, in the communicating position, in which the person sitting in the airplane seat 10 can take care of the small child during the flight, the seat 16 is at chest level of the person sitting on the airplane seat, partly within the head strike arc 13.

The seat 16 may be securely locked in the top position. The communicating position does not have to be a predetermined fixed position. Rather, in the lower part of the mounting 15, the seat 16 can be adjusted to a selectable communicating position.

Figure 2:
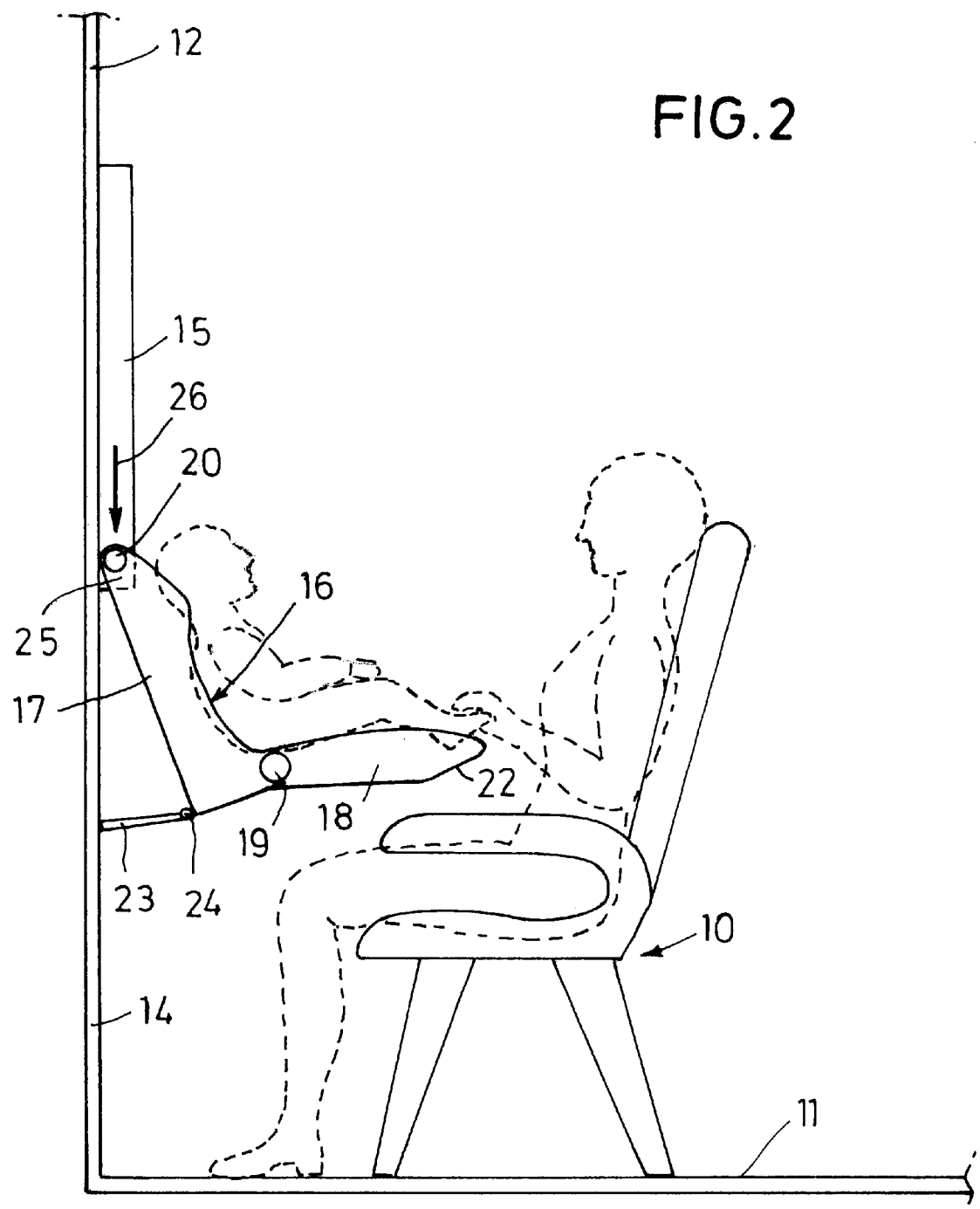
FIG. 2 illustrates a side elevational view of the child's seat with the seat in the lower position and in an inclined condition.

On the rear of the back portion 17, or at the mounting 15, a support means 23 is provided that may be unfolded as illustrated in FIG. 2 to incline the seat 16 relative to the partition wall 12. In the present case, the support means 23 can be pivoted out around a hinge 24 of the back portion 17. It may be folded against the back portion if the seat is not to be inclined.

Further, FIG. 2 also illustrates that the molded seat surface 18 can be pivoted relative to the back portion 17 about the hinge 19 and adjusted so that the seat 16 may be adjusted in the sleeping position illustrated in FIG. 2.

To facilitate lifting the seat 16 from the communicating position 22 into the takeoff and landing position 21, a drive device (not illustrated) may be provided that effects or assists lifting. Further, the lower end of the back portion 17 is guided on the mounting 15 such that at least in the takeoff and landing position the back portion 17 is fully fixed and cannot be pivoted outward.

Further, the molded seat surface 18 can be swivelled towards the back portion 17 about the hinge 19 so that the child's seat takes up minimum space when not in use. In this condition, the child's seat can be moved to the top position so as to not hinder a person sitting on the airplane seat 10.

What is claimed is:

1. A child's seat for airplanes comprising mounting means (15) for fastening to a partition wall (12) of an aircraft, and a seat (16) vertically movable along the mounting means (15) and being adapted to be fixed in at least two vertical positions (21, 22).

2. The child's seat for airplanes as defined in claim 1 wherein the seat (16) is a bucket seat having a back portion (17) and a molded seat portion (18) pivotally adjustable relative to the back portion.

3. The child's seat for airplanes as defined in claim 1 wherein the seat (16) includes a back portion (17) having a top end (25), the seat (16) is suspended from the mounting means (15) by the top end (25), and the back portion (17) includes a movable support device (23) for effecting an inclined position of the back portion (17) relative to a partition wall (12).

4. The child's seat for airplanes as defined in claim 2 wherein the molded seat portion (18) may be pivoted up against the back portion (17).

5. The child's seat for airplanes as defined in claim 1 wherein the seat (16) may be pivoted and fixed about an axis which is transverse to the vertical movement (16).

6. The child's seat for airplanes as defined in claim 1 including drive means for moving the seat (16) along the mounting means (15).

7. A combination comprising an airplane compartment defined at least in part by a floor (11) and a vertical partition (12), a child's seat (16), mounting means (15) for fastening the child's seat (16) to-the vertical partition (12), and said seat (16) being vertically movable along the mounting means (15) and fixed in at least two vertical positions (21, 22).

8. The combination as defined in claim 7 wherein the seat (16) is a bucket seat having a back portion (17) and a molded seat portion (18) pivotally adjustable relative to the back portion.

9. The combination as defined in claim 7 wherein the seat (16) includes a back portion (17) having a top end (25), the seat (16) is suspended from the mounting means (15) by the top end (25), and the back portion (17) includes a movable support device (23) for effecting an inclined position of the back portion (17) relative to a partition wall (12).

10. The combination as defined in claim 7 wherein the molded seat portion (18) may be pivoted up against the back portion (17).

11. The combination as defined in claim 7 wherein the seat (16) may be pivoted and fixed about an axis which is transverse to the vertical movement (16).

12. The combination as defined in claim 7 including drive means for moving the seat (16) along the mounting means (15).

13. The combination as defined in claim 7 including a passenger seat (10) facing the child's seat (16), the passenger seat (10) being spaced from the partition wall (12) along a head strike arc (13) defined by the arc of travel of the head of a belted seated person between upright and bent-over positions, and an uppermost of said two vertical positions (21, 22) maintains the seat (16) above the head strike arc (13).

14. The combination as defined in claim 7 including means for locking the seat (16) in the uppermost vertical position.

15. The combination as defined in claim 7 wherein the head strike arc (13) defines the minimum distance of the seat (10) from the partition wall (12).

16. The combination as defined in claim 7 including means for locking the seat (16) in the uppermost vertical position, and means for selectively adjusting the position of the seat (16) in a lowermost of said vertical positions.

17. The combination as defined in claim 13 wherein the seat (16) is a bucket seat having a back portion (17) and a molded seat portion (18) pivotally adjustable relative to the back portion.

18. The combination as defined in claim 15 including means for locking the seat (16) in the uppermost vertical position.

19. The combination as defined in claim 15 including means for locking the seat (16) in the uppermost vertical position, and means for selectively adjusting the position of the seat (16) in a lowermost of said vertical positions.

20. The combination as defined in claim 13 wherein the seat (16) includes a back portion (17) having a top end (25), the seat (16) is suspended from the mounting means (15) by the top end (25), and the back portion (17) includes a movable support device (23) for effecting an inclined position of the back portion (17) relative to a partition wall (12).

21. The combination as defined in claim 13 wherein the molded seat portion (18) may be pivoted up against the back portion (17).

22. The combination as defined in claim 13 including drive means for moving the seat (16) along the mounting means (15).

23. The combination as defined in claim 14 wherein the seat (16) may be pivoted and fixed about an axis which is transverse to the vertical movement (16).

* * * * *